Feb. 15, 1966  J. C. CHEZAUD ET AL  3,235,434
METHOD OF AND APPARATUS FOR STIFFENING FLEXIBLE SUPPORTS
Filed July 30, 1962  2 Sheets-Sheet 1
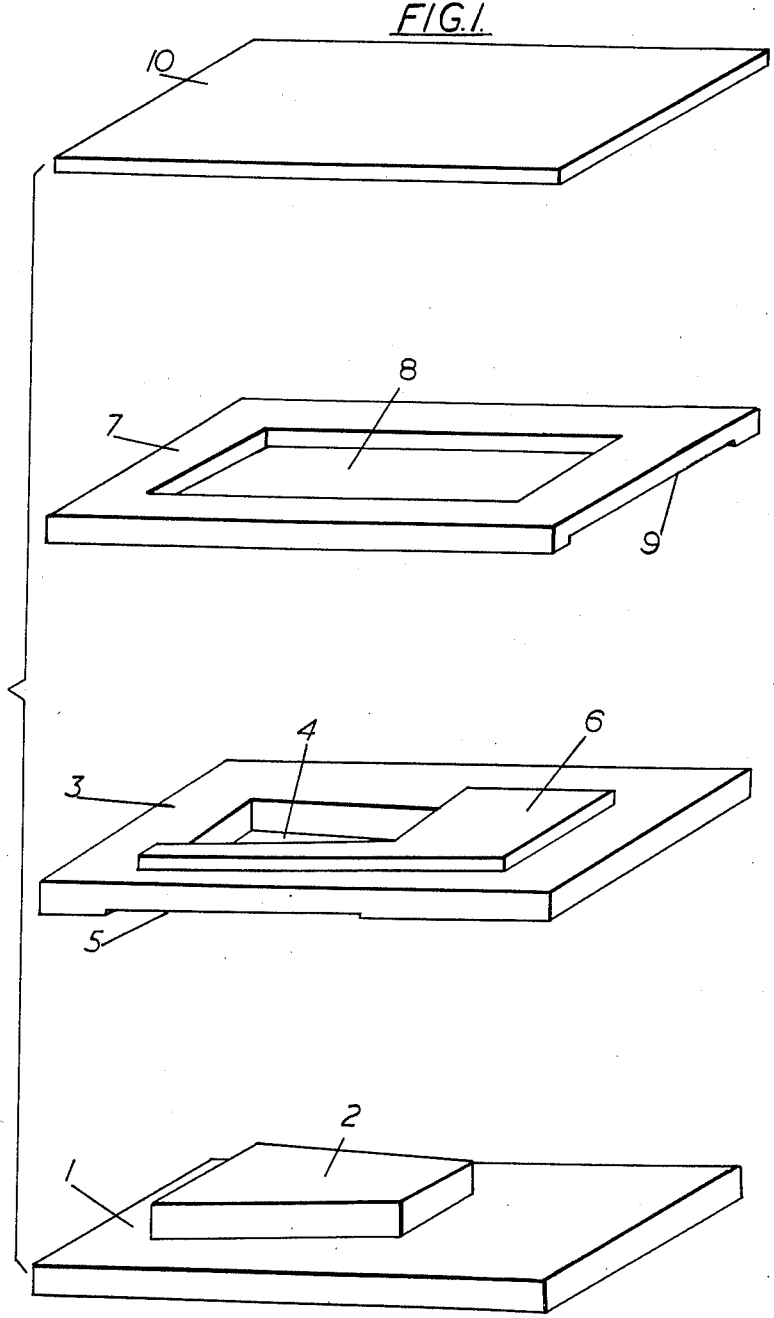
Inventors
Jean Claude Chezaud
Pierre Burillon
Dominique Mangieri
By Stevens Davis Miller & Mosher Attorneys Feb. 15, 1966   J. C. CHEZAUD ET AL   3,235,434
METHOD OF AND APPARATUS FOR STIFFENING FLEXIBLE SUPPORTS
Filed July 30, 1962   2 Sheets-Sheet 2
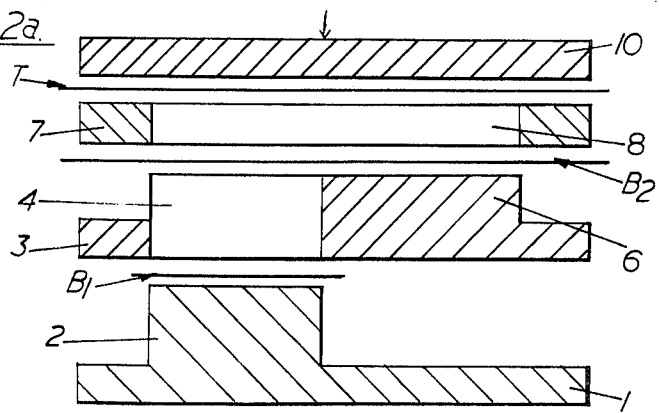
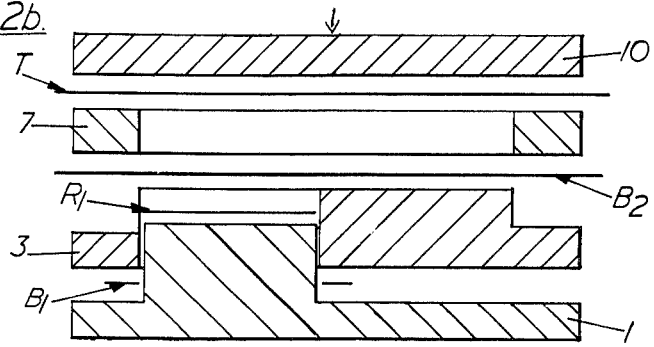
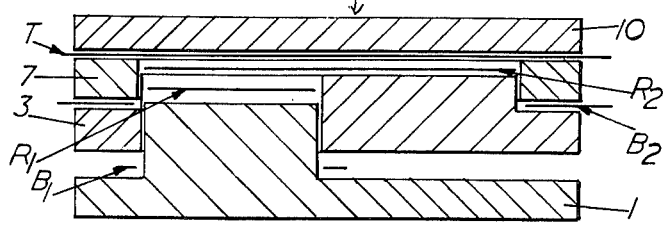
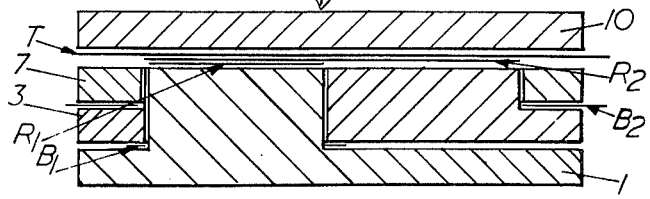
Inventors
Jean Claude Chezaud
Pierre Burillon
Dominique Mangieri
By Stevens Davis Miller & Mosher   Attorneys

United States Patent Office 3,235,434
Patented Feb. 15, 1966

3,235,434
METHOD OF AND APPARATUS FOR STIFFENING FLEXIBLE SUPPORTS
Jean Claude Chezaud, St-Rambert l'Lle Barbe, Pierre Burillon, Lyon, and Dominique Mangieri, Cailloux-sur-Fontaine, France, assignors to Societe Rhodiaceta, Paris, France, a French body corporate of France
Filed July 30, 1962, Ser. No. 213,367
Claims priority, application France, Aug. 2, 1961, 869,837
15 Claims. (Cl. 156—263)

This invention relates to a method of and apparatus for the production of stiffening elements for articles such as shirt collars. These elements generally comprise two superposed reinforcements of different surface area connected to a thin flexible support such as a collar band, the reinforcements having a base of a thermoadhesive material and being connected to the support by the action of heat and pressure.

A usual method for producing these stiffening elements for a shirt collar comprises, for example, the following operations.

(1) Formation of a "pad" for cutting out a large reinforcement;
(2) Tracing the outlines of this large reinforcement;
(3) Cutting out the large reinforcement;
(4) Forming a "pad" for cutting out a small reinforcement;
(5) Tracing the outlines of the small reinforcement;
(6) Cutting out the small reinforcement;
(7) Positioning the reinforcements on the supporting collar band by means of a smoothing iron; and
(8) Adhesively securing under pressure the reinforcements to the support.

This method has various disadvantages arising from the number and complexity of the various operations. Thus the labour costs are high and there is risk of the reinforcements or support being misplaced or insecurely fastened to one another.

An object of the present invention is to provide a method of stiffening a flexible support which reduces or obviates the aforementioned disadvantages which is both effective and reliable while being cheap and suitable for mass production methods.

According to the invention there is provided a method of stiffening a thin flexible support such as a collar band with two reinforcements of unequal dimensions wherein two strips of reinforcing material are brought to the support, such material being at least partly coated with a thermoadhesive or being a thermoplastic material, and the small reinforcement is cut from one strip, the large reinforcement is cut from the other strip, and all in the same operation the two reinforcements thus obtained are adhesively secured to the support. Preferably reinforcements are cut from the strips by punches passing through apertures in appropriately shaped dies. Conveniently the punch for cutting out the smaller reinforcement may pass through an aperture in a die to form with the die a two part punch for cutting out the larger reinforcement in co-operation with a second die.

The invention also provides apparatus for carrying out the above method, such apparatus comprising a first punching device formed of a punch member co-operable with a die plate apertured in accordance with the shape to be given to the smaller reinforcement, a second punching device comprising a punch and a die apertured in accordance with the shape to be given to the larger reinforcement, the first punch being adapted to project through an aperture in the punch of the second punching device to form an operative part of the punch of the second punching device, and a plate adapted to compress the support and the two reinforcements between the plate and the punch of the second punching device. Desirably the punch of the second punching device comprises the die of the first punching device in combination with the punch of the first punching device, the first punch being adapted to project through the aperture in the first die to form an operative part of the second punch. Conveniently at least one of the elements of each punching device may be provided with grooves for retaining the strips from which the reinforcements are to be cut out. Preferably means are provided for causing relative movement of the first punch and the plate towards and away from each other whereby the reinforcements may be cut out and compressed against the support. It will be appreciated that more than two punching devices may be provided in series whereby more than two reinforcements can be cut out and secured to a support.

In order to ensure satisfactory adhesion between the different parts of the stiffening elements i.e. between the reinforcements and the support, in addition to the initial compression and heating of the elements which initially secures the different parts together, the elements may be subjected to a subsequent treatment by heat and pressure in a press of a conventional type.

It is advantageous to provide between the two elements of each punching device, grooves of appropriate shape permitting the introduction and advance of the strips of thermoadhesive material from which the reinforcements are cut out, these strips being displaced by the desired movement between successive operations. These grooves can be formed in one or other, or both of the two elements of the punching device, or in an auxiliary intermediate part as desired in any particular embodiment.

It is also possible to provide below the plate or pressing element one or more intermediate parts which contribute to holding the collar band or the flexible support in position during the operation.

The invention is described, merely by way of example, with reference to the accompanying drawings, in which:

FIGURE 1 is a diagrammatic exploded view in perspective of one embodiment of apparatus according to the invention; and FIGURES 2a to 2d are sectional views of the apparatus of FIGURE 1 showing the apparatus in various operational positions.

Referring to FIGURE 1 a first punching device, used for cutting out a small reinforcement, is constituted by a punch element 1 with a relief punching portion 2 which has a surface corresponding to the required shape of the small reinforcement, and by a die element 3 having an aperture 4 which co-operates during operation of the apparatus with the relief punching portion 2 of the first punch element 1. This die 3 is provided at its underside with a groove 5 for the passage of the strip of thermoadhesive material from which the small reinforcement is cut out.

A second punching device, used for cutting out a large reinforcement, comprises the element 3 which acts as a punch element at its relief punching portion 6, the form of which corresponds to the shape required for the large reinforcement, and a die element 7 having an aperture 8 which co-operates, during operation of the apparatus, with the relief portion 6 of the element 3 in combination with the relief portion 2 of the punch element 1. The die element 7 comprises at its underside a groove 9 for passage of the strip of thermoadhesive material from which the large reinforcement is cut out.

Finally a pressing element in the form of a plate 10 is provided above the element 7. The plate 10, in use, is heated by a suitable electrical or other heating device (not shown) and is vertically reciprocable by means of a motor (also not shown) which may be manually, electromagnetically or pneumatically controlled as required.

Referring to FIGURES 2a to 2d of the drawings, a thin flexible support in the form of a collar band is represented by T while $B_1$ and $B_2$ represent two displaceable strips of thermoadhesive material from which two reinforcements $R_1$ and $R_2$ are cut out during the operation of the apparatus.

In FIGURE 2a, the apparatus is in its "inoperative" position with the collar band T in position between the plate 10 and the die element 7, the strip $B_1$ between the first punch element 1 and the die element 3, and the strip $B_2$ between the punch element 3 and the die element 7.

In FIGURE 2b, a pressure has been exerted on the plate 10 in the direction indicated by the arrow. The relief portion of the punch element 1 has engaged in the aperture in the element 3, thus cutting out the small reinforcement $R_1$ from the strip $B_1$.

In FIGURE 2c, again under the action of the pressure exerted in the plate 10, the relief portion of the element 3 has engaged in the aperture in the die element 7, as has also the relief portion of the punch element 1, the two relief punching portions together cutting out the large reinforcement $R_2$ from the strip $B_2$.

In FIGURE 2d, the operation is shown completed. The two reinforcements $R_1$ and $R_2$ contact the collar band T to which they are adhesively secured to the action of heat and pressure from the plate 10. When the pressure exerted on the said plate 10 is discontinued, the entire apparatus returns to the positions shown in FIGURE 2a; the collar band provided with its two reinforcements is withdrawn and replaced by another, the strips $B_1$ and $B_2$ are advanced by the necessary amount, and the sequence of steps can be re-commenced.

It will be appreciated that by providing more than two punching devices in series, it is possible to provide a support with a stiffening of more than one reinforcement providing always that the size of the reinforcements increases towards the support with each punch helping to cut out each of the larger reinforcements above. The reinforcing material may be in the form of thermoplastic material or may be at least partly coated with a thermoadhesive so that it can be secured to the support upon the application of heat and pressure.

The apparatus according to the invention permits of a considerable saving in time as compared with the method of working used hitherto. Furthermore, the reinforcements are always cut out and stuck to the collar band with the same precision, which eleminates the human factor which has previously been inevitable due to the necessary operations having been carried out manually.

We claim:

1. A method of stiffening a thin flexible support which comprises the steps of taking two strips of reinforcing thermoadhesive material; bringing said strips to said support; and in one operation cutting a small reinforcement from one strip, cutting a larger reinforcement from the second strip, and adhesively securing the small reinforcement to the large reinforcement and the large reinforcement to the said support.

2. A method of stiffening a collar which comprises taking a collar band, bringing two strips of reinforcing thermoadhesive material to the band, and in a single operation cutting a small reinforcement from one strip, cutting a larger reinforcement from the second strip and applying heat and pressure to said two reinforcements and the collar band thereby adhesively to secure the small reinforcement to the large reinforcement and the large reinforcement to said collar band.

3. A method of stiffening a thin flexible support which comprises the step of taking two strips of reinforcing thermoplastic material; bringing said strips to said support; and in one operation cutting a small reinforcement from one strip, cutting a larger reinforcement from the second strip and adhesively securing the small reinforcement to the large reinforcement and the large reinforcement to the support; the reinforcements being cut from said strips by forcing punches through apertures in appropriately shaped dies.

4. A method of stiffening a collar which comprises taking a collar band, bringing two strips of reinforcing material to the band, said strips of reinforcing material being at least partly coated with a thermoadhesive material, cutting a small reinforcement from one strip by passing a first punch through an aperture in a first die, in the same operation cutting a larger reinforcement from the second strip by means of a two-part punch comprising the said first punch in combination with said first die and a second die, and in the same operation applying heat and pressure to said two reinforcements and the collar band thereby adhesively to secure the small reinforcement to the large reinforcement and the large reinforcement to said collar band.

5. The method of claim 4 wherein the reinforcements are adhesively secured to the support by compressing said reinforcements and said support between the two-part punch and a heated plate.

6. A method of stiffening a thin flexible support which comprises the steps of taking a plurality of strips of reinforcing thermoadhesive material; bringing said strips to said support; and in a single operation cutting a small reinforcement from a first of said strips, cutting successively larger reinforcements from each succeeding strip, and applying heat and pressure adhesively to secure the plurality of reinforcements to each other with the largest reinforcement being secured to said support.

7. Apparatus for stiffening a thin flexible support which comprises a first punchnig device formed of a punch member and a die plate co-operable therewith, said die plate being apertured in accordance with a smaller reinforcement to be applied to the said support; a second punching device comprising a punch and die apertured in accordance with the shape to be given to a larger reinforcement, the punch of the second punching device having an aperture through which the punch of the first punching device is adapted to project to form an operative part of the punch of the second punching device; and a plate movable in relation to the punch of the second punching device whereby said supports and said two reinforcements can be compressed between said plate and said punch of the second punching device.

8. Apparatus according to claim 7 comprising means for heating the plate.

9. Apparatus according to claim 7 wherein the die of each punching device is provided with a groove, such grooves being adapted to receive strips of reinforcing material from which reinforcements are to be cut.

10. Apparatus for stiffening a collar by applying reinforcements to a collar band which comprises a first punching device formed of a punch member and a die plate co-operable therewith, said die plate being operated in accordance with the shape of a smaller reinforcement to be applied to said support; a second punching device comprising a punch and a die apertured in accordance with the shape to be given to a larger reinforcement; the punch of the second punching device comprising the die of the first punching device in combination with the punch of the first punching device, the punch of the first punching device projecting through the aperture in the die of the first punching device; and a plate movable in relation to the punch of the second punching device whereby said collar band and two reinforcements can be compressed between said plate and said punch of the second punching device.

11. The apparatus of claim 10 wherein means are provided for moving the plate towards the punching devices.

12. The apparatus of claim 10 wherein means are provided for heating the plate.

13. Apparatus for applying a plurality of reinforcements to a collar band to stiffen a collar, such apparatus comprising a plurality of punching devices each including a punch element and a die element, the die element of each device comprising the punch element of the succeeding device and each succeeding punching device being adapted to cut out a larger reinforcement, the punch for cutting out a reinforcement including the punch for cutting out any smaller reinforcement, and a plate movable in relation to the punch for cutting out the largest reinforcement whereby the reinforcements and the collar band can be compressed between the plate and the punch for cutting out the largest reinforcement.

14. The apparatus of claim 13 which includes means for moving the plate towards the punch for cutting out the smallest reinforcement whereby the reinforcements may be cut out and compressed against the collar band in one operation.

15. The apparatus of claim 13 wherein at least one of the elements of each punching device is provided with grooves for retaining the strips of reinforcing material from which the reinforcements are to be cut.

References Cited by the Examiner
UNITED STATES PATENTS

| | | | |
|---|---|---|---|
| 804,108 | 11/1905 | Evans | 83—622 |
| 1,457,624 | 6/1922 | Fox | 83—622 |
| 1,995,077 | 3/1935 | Perryman | 156—261 |
| 2,033,553 | 3/1936 | Scholl | 156—261 |
| 2,627,212 | 2/1953 | Connor et al. | 156—521 |

EARL M. BERGERT, *Primary Examiner.*

DOUGLAS J. DRUMMOND, *Examiner.*